US009253700B2

(12) United States Patent
Kubota (10) Patent No.: US 9,253,700 B2
(45) Date of Patent: Feb. 2, 2016

(54) RADIO BASE STATION, RELAY BASE STATION, MOBILE TERMINAL, MOBILE COMMUNICATION SYSTEM, AND OPERATION CONTROL METHOD

(75) Inventors: Mitsuhiro Kubota, Tokyo (JP); Akihiko Kubota, legal representative, Ehime (JP); Junko Kubota, legal representative, Ehime (JP)

(73) Assignee: NEC CORPORATION, Tokyo (JP)

( * ) Notice: Subject to any disclaimer, the term of this patent is extended or adjusted under 35 U.S.C. 154(b) by 200 days.

(21) Appl. No.: 13/885,265

(22) PCT Filed: Sep. 14, 2011

(86) PCT No.: PCT/JP2011/005166
§ 371 (c)(1),
(2), (4) Date: May 14, 2013

(87) PCT Pub. No.: WO2012/073410
PCT Pub. Date: Jun. 7, 2012

(65) Prior Publication Data
US 2013/0229942 A1 Sep. 5, 2013

(30) Foreign Application Priority Data
Dec. 1, 2010 (JP) ................................. 2010-267950

(51) Int. Cl.
*H04W 36/22* (2009.01)
*H04W 84/04* (2009.01)
*H04W 16/08* (2009.01)
(52) U.S. Cl.
CPC .............. *H04W 36/22* (2013.01); *H04W 16/08* (2013.01); *H04W 84/045* (2013.01)
(58) Field of Classification Search
None
See application file for complete search history.

(56) References Cited

U.S. PATENT DOCUMENTS

| 2002/0037719 | A1 | 3/2002 | Ariga et al. | |
| 2007/0218908 | A1* | 9/2007 | Kang et al. | 455/442 |
| 2007/0249347 | A1* | 10/2007 | Saifullah et al. | 455/436 |

(Continued)

FOREIGN PATENT DOCUMENTS

| JP | 2002-141859 A | 5/2002 |
| JP | 2008-205566 A | 9/2008 |
| JP | 2009-267708 A | 11/2009 |
| JP | 2011-155401 A | 8/2011 |
| WO | 2009/050794 A1 | 4/2009 |
| WO | 2010/009579 A1 | 1/2010 |

OTHER PUBLICATIONS

ZTE, Discussion of Ralay Mobility, 3GPP TSG RAN WG2 #67 R2-094679, Aug. 24-28, 2009.*

(Continued)

*Primary Examiner* — Huy D Vu
*Assistant Examiner* — Hong Shao
(74) *Attorney, Agent, or Firm* — Sughrue Mion, PLLC (57) ABSTRACT

To achieve load distribution in a short period of time, a mobile communication system includes a mobile terminal (505), a radio base station (503), and a relay base station (504) that relays radio communication between the radio base station (503) and the mobile terminal (505). In the mobile communication system having such a configuration, the radio base station (503) includes control means for handing over the subordinate relay base station (504) to a neighboring radio base station (503) when a load on the radio base station is greater than a predetermined threshold. The control means is preferably configured to confirm whether the neighboring base station (503) can accept the relay base station (504) upon handover of the relay base station (504).

3 Claims, 10 Drawing Sheets

(56) References Cited

U.S. PATENT DOCUMENTS

| | | | |
|---|---|---|---|
| 2009/0156214 A1* | 6/2009 | Lee et al. | 455/436 |
| 2010/0061339 A1 | 3/2010 | Kim et al. | |
| 2010/0173644 A1* | 7/2010 | Koyanagi | 455/453 |
| 2011/0110270 A1 | 5/2011 | Leng et al. | |
| 2012/0063417 A1* | 3/2012 | Redana et al. | 370/331 |

OTHER PUBLICATIONS

3GPP, 3rd Generation Partnership Project, 3GPP TR 36.806 v9.0.0, Mar. 2010.*

"3GPP TS 36.423 version 10.0.0 Release 10", ETSI TS 136 423 V10.0.0, Jan. 2011.

"3GPP TS 36.331 version 9.3.0 Release 9", ETSI TS 136 331 V9.3.0, Jul. 2010.

"3rd Generation Partnership Project; Technical Specification Group Radio Access Network; Evolved Universal Terrestrial Radio Access (E-UTRA); Relay architectures for E-UTRA (LTE-Advanced) (Release 9)", 3 GPP TR 36.806 V9.0.0, 3GPP, Mar. 2010, p. 33.

"ZTE, Discussion of Relay Mobility", 3GPP TSG RAN WG2 #67 R2-094679, Aug. 24-28, 2009.

International Search Report of PCT/JP2011/005166 dated Dec. 13, 2011.

Communication dated Apr. 24, 2014, issued by the Russian Patent Office in corresponding Application No. 2013129776/07(044284).

* cited by examiner

RADIO BASE STATION, RELAY BASE STATION, MOBILE TERMINAL, MOBILE COMMUNICATION SYSTEM, AND OPERATION CONTROL METHOD

CROSS REFERENCE TO RELATED APPLICATIONS

This is a National Stage of International Application No. PCT/JP2011/005166 filed Sep. 14, 2011, claiming priority based on Japanese Patent Application No. 2010-267950 filed Dec. 1, 2010, the contents of all of which are incorporated herein by reference in their entirety.

TECHNICAL FIELD

The present invention relates to a radio base station, a relay base station, a mobile terminal, a mobile communication system, and an operation control method. In particular, the present invention relates to a mobile communication system including a relay base station that relays radio communication between a radio base station and a mobile terminal.

BACKGROUND ART

As radio access methods, Long Term Evolution (LTE) adopts uplink Single Carrier (SC)-Frequency Division Multiple Access (FDMA) and downlink Orthogonal Frequency Division multiple Access (OFDMA).

The OFDMA is a digital modulation demodulation scheme by which a plurality of carriers (sub-carriers) are multiplexed using orthogonality of frequencies. Accordingly, it is said that the OFDMA is highly resistant to fading and multipath interference. The features of the SC-FDMA are similar to those of the OFDMA. The SC-FDMA is different from the OFDMA in that carriers are continuously allocated to users. Thus, an improvement in uplink power efficiency is expected in the SC-FDMA, as compared with the OFDMA. Uplink radio resources provided in the LTE are divided into frequency and time components. The divided radio resources are allocated to users.

Figure 1:
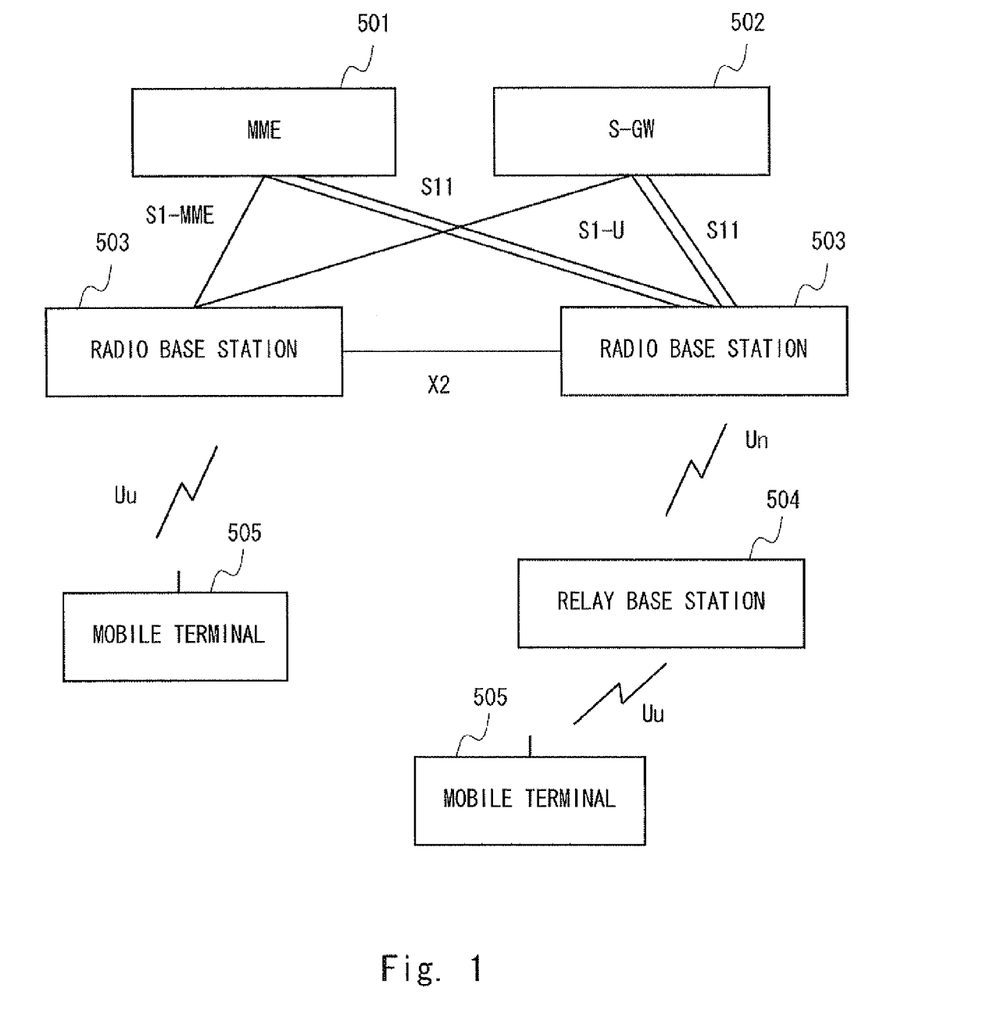
FIG. 1 is a diagram showing an LTE network configuration according to an exemplary embodiment of the present invention.

An LTE network configuration relevant to the present invention will be described with reference to FIG. 1. Though FIG. 1 shows an LTE network configuration according to an exemplary embodiment of the present invention, it is similar to the LTE network configuration relevant to the present invention. Therefore, the LTE network configuration relevant to the present invention will be described with reference to FIG. 1.

Referring to FIG. 1, a Mobility Management Entity (MME) 501 has a function of transmitting/receiving control signals through an S1-MME link to/from each radio base station (eNB (evolved Node B)) 503. A Serving-Gateway (S-GW) 502 has a function of transmitting/receiving user data through an S1-U link to/from each radio base station 503. The radio base stations 503 are connected through an X2 link.

The radio base station 503 can accommodate a relay base station 504. 3GPP Rel-10 specifies the relay base station 504. The relay base station 504 is connected to the radio base station 503 through a Un link, thereby configuring a cell. The radio base station 503 that accommodates the relay base station 504 is referred to as "Doner eNB (DeNB)". The radio base station 503 serving as a DeNB has a function of transferring data between a core network (MME 501 and S-GW 502) and the relay base station 504. The data transferred between the core network and the relay base station 504 is transmitted between the core network and the radio base station 503 through an S11 link. The radio base station 503 and the relay base station 504 have a function of transmitting/receiving data to/from a mobile terminal 505.

To implement load distribution in a mobile communication system having a network configuration as described above, it is necessary for the radio base station 503 to recognize the load status of the neighboring radio base station 503. As a method therefor, Non Patent Literature 1 specifies a method in which the neighboring radio base stations 503 report the load status of respective cells through the X2. Specifically, a report on the load is requested by Resource Status Request, and a response is sent by Resource Status Response. Each radio base station 503 can transmit/receive information on the usage rate of Physical Resource Block (PRB), load on HW, load on a backhaul link and load on the entire radio base station 503, by using Resource Status Update.

The handover in the LTE is executed by using as a trigger a reception quality measurement report originated from the mobile terminal 505. The types of the report at the same frequency are Events A1 to A5. Among them, Event A4 is assumed to be used in the present invention as the report. The report of Event A4 is transmitted when the reception quality of a neighboring cell, which is measured by the mobile terminal 505, exceeds a threshold. According to Non Patent Literature 2, Event A4 is transmitted when the following conditions are satisfied.

$$Mn+Ofn+Ocn-Hys>Thresh$$

Mn: signal reception intensity of an neighboring cell
Ofn: offset related to a used frequency band
Ocn: offset related to the neighboring cell
Hys: hysteresis
Thresh: threshold for Event A4

Figure 9:
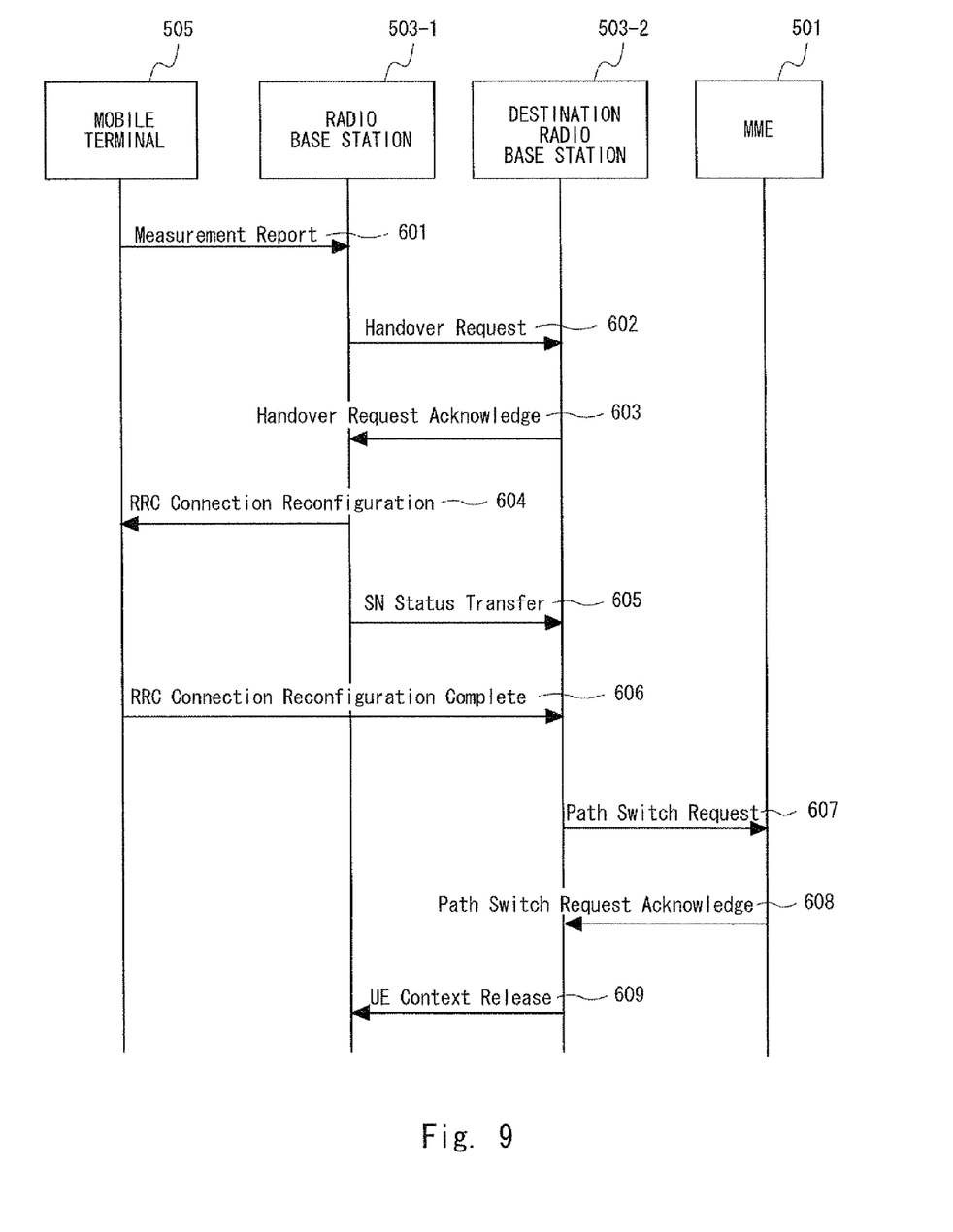
FIG. 9 is a sequence chart showing a handover procedure in a case of using an X2 link.

A handover procedure between the radio base station 503 and the mobile terminal 505 will be described below. FIG. 9 is a sequence chart showing a handover procedure in the case of using the X2 link. Referring to FIG. 9, the mobile terminal 505 measures reception qualities of the serving cell and a destination cell, and reports them to a radio base station 503-1 (step 601). The radio base station 503-1 having received the report transmits a handover request to a destination radio base station 503-2 (step 602). The destination radio base station 503-2 performs call acceptance control and notifies the result of control to the radio base station 503-1 (step 603).

The radio base station 503-1 requests the mobile terminal 505 to execute handover (step 604). The radio base station 503-1 notifies the destination radio base station 503-2 of a sequence number of packet (step 605). This prevents missing or duplication from occurring in the transmission of packets. The mobile terminal 505 notifies the destination radio base station 503-2 of completion of the handover (step 606).

The destination radio base station 503-2 requests the MME 501 to perform path switching (step 607). The MME 501 performs the path switching and sends a notification to the destination radio base station 503-2 (step 608). The destination radio base station 503-2 requests the radio base station 503-1 to delete information on the mobile terminal 505 having completed the handover (step 609).

Figure 10:
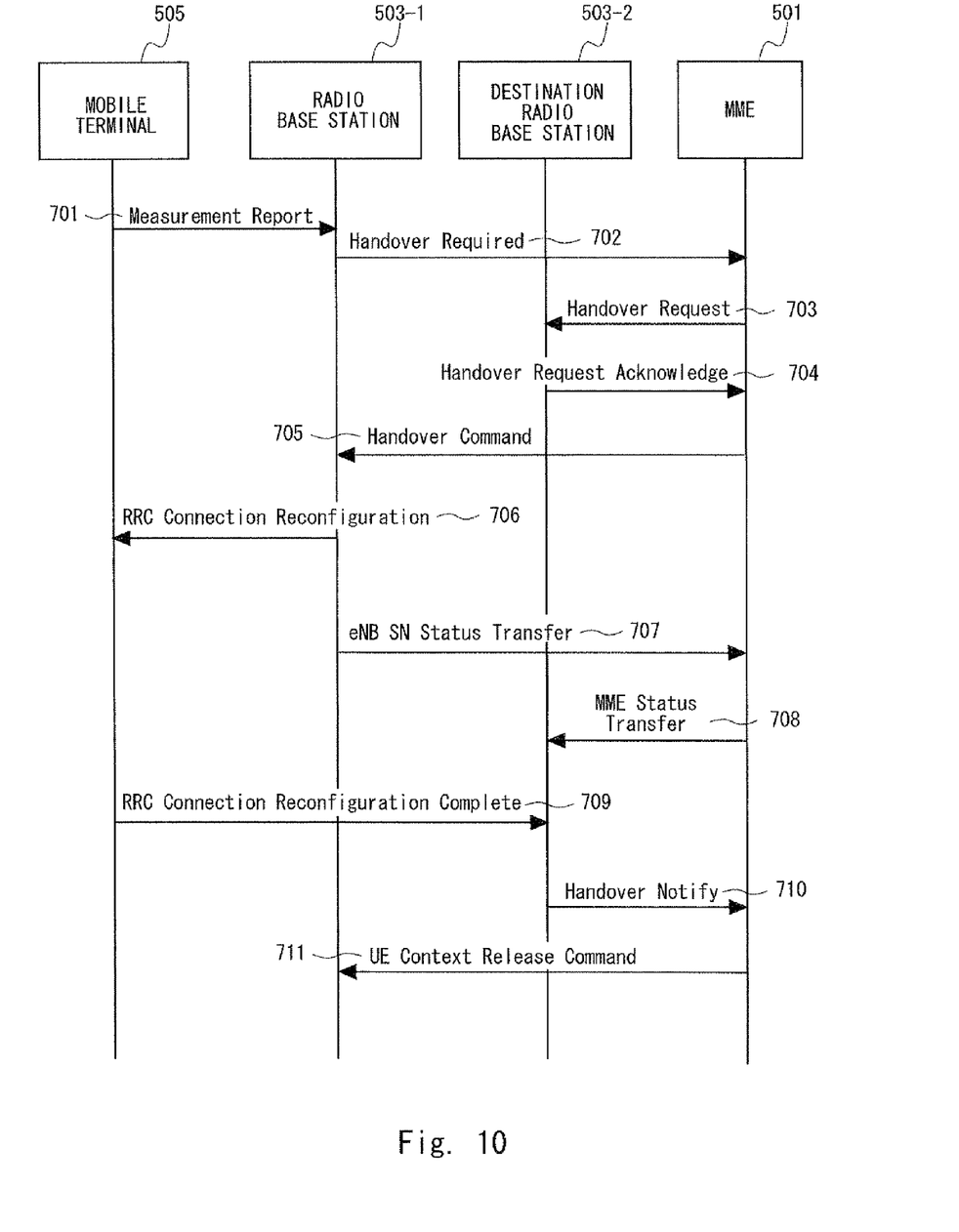
FIG. 10 is a sequence chart showing a handover procedure in a case of using an S1 link.

FIG. 10 is a sequence chart showing a handover procedure in the case of using an S1 link. Referring to FIG. 10, the mobile terminal 505 measures the reception qualities of the serving cell and the destination cell, and reports them to the radio base station 503-1 (step 701). The radio base station 503-1 having received the report transmits a handover request to the MME 501 (step 702). The MME 501 transmits the handover request to the destination radio base station 503-2 (step 703).

The destination radio base station 503-2 performs a call acceptance control, and notifies the result of control to the MME 501 (step 704). The MME 501 notifies the radio base station 503-1 of the result (step 705). The radio base station 503-1 requests the mobile terminal 505 to execute handover (step 706). The radio base station 503-1 notifies the MME 501 of a sequence number of packet (step 707). This prevents missing or duplication from occurring in the transmission of packets.

The MME 501 notifies the destination radio base station 503-2 of the sequence number of packet (step 708). The mobile terminal 505 notifies the destination radio base station 503-2 of completion of the handover (step 709). The destination radio base station 503-2 notifies the MME 501 of completion of the handover (step 710). The MME 501 requests the radio base station 503-1 to delete information on the mobile terminal 505 having completed the handover (step 711).

One of methods for modifying a network configuration depending on a load is disclosed in Patent Literature 1.

CITATION LIST

Patent Literature

[Patent Literature 1] Japanese Unexamined Patent Application Publication No. 2009-267708

Non Patent Literature

[Non Patent Literature 1] 3GPP TS 36.423 V10.0.0
[Non Patent Literature 2] 3GPP TS 36.331 V9.3.0

SUMMARY OF INVENTION

Technical Problem

In the above-mentioned LTE network configuration relevant to the present invention, the relay base station connects only to a specific radio base station. Resources for the backhaul link Un are necessary for the relay base station to connect to the radio base station. In the radio base station connected with a plurality of relay base stations, radio resources are depleted when the number of mobile terminals directly connected to the radio base station is increased.

At this time, if a certain amount of radio resources remains in a neighboring cell, radio resources can be effectively used by implementing load distribution between cells. If the radio base station causes each mobile terminal to execute handover, there are such problems that message processing through a radio link Uu is increased and it takes a long time to implement the load distribution.

Note that Patent Literature 1 discloses the example of methods for modifying the network configuration depending on the load, but fails to disclose operations in a case where the load on a radio base station that accommodates a relay base station under the control thereof increases.

It is an exemplary object of the present invention to provide a radio base station, a relay base station, a mobile terminal, a mobile communication system and an operation control method, which can solve the above-mentioned problems and achieve load distribution in a short period of time.

Solution to Problem

A radio base station according to a first exemplary aspect of the present invention is a radio base station in a mobile communication system. This radio base station includes control means for handing over a subordinate relay base station to a neighboring radio base station when a load on the radio base station is greater than a predetermined threshold. The relay base station relays radio communication between the radio base station and a mobile terminal.

An operation control method according to a second exemplary aspect of the present invention is a method of controlling operations of a radio base station in a mobile communication system. This method includes the step of: handing over a subordinate relay base station to a neighboring radio base station when a load on the radio base station is greater than a predetermined threshold. The relay base station relays radio communication between the radio base station and a mobile station.

A relay base station according to a third exemplary aspect of the present invention is a relay base station that relays radio communication between a radio base station and a mobile terminal in a mobile communication system. This relay base station includes control means for receiving a handover execution request transmitted from the radio base station to hand over the relay base station from the radio base station to a neighboring radio base station when a load on the radio base station is greater than a predetermined threshold in the radio base station, and for then executing handover to the neighboring radio base station.

An operation control method according to a fourth exemplary aspect of the present invention is a method of controlling operations of a relay base station that relays radio communication between a radio base station and a mobile terminal in a mobile communication system. This method includes the step of receiving a handover execution request transmitted from the radio base station to hand over the relay base station from the radio base station to a neighboring radio base station when a load on the radio base station is greater than a predetermined threshold in the radio base station, and executing handover to the neighboring radio base station.

A mobile terminal according to a fifth exemplary aspect of the present invention is a mobile terminal in a mobile communication system including a mobile terminal, a radio base station, and a relay base station that relays radio communication between the radio base station and the mobile terminal. This mobile terminal includes control means for receiving, from the relay base station, a notification indicating occurrence of a temporal interruption of communication and information on a reconnection start time during handover of the relay base station to an neighboring radio base station, the relay base station receiving a handover execution request transmitted from the radio base station to hand over the relay base station from the radio base station to the neighboring radio base station when a load on the radio base station is greater than a predetermined threshold in the radio base station, and for then maintaining an RRC_connected state and sending a connection request to the relay base station at the reconnection start time.

An operation control method according to a sixth exemplary aspect of the present invention is a method of controlling operations of a mobile terminal in a mobile communication system including the mobile terminal, a radio base station, and a relay base station that relays radio communication between the radio base station and the mobile terminal. This method includes the step of: receiving, from the relay base station, a notification indicating occurrence of a temporal interruption of communication and information on a reconnection start time during handover of the relay base station to an neighboring radio base station, the relay base station receiving a handover execution request transmitted from the radio base station to hand over the relay base station from the radio base station to the neighboring radio base station when a load on the radio base station is greater than a predetermined threshold in the radio base station; and then maintaining an RRC_connected state and sending a connection request to the relay base station at the reconnection start time.

A mobile communication system according to a seventh exemplary aspect of the present invention includes: a mobile terminal; a radio base station; and a relay base station that relays radio communication between the radio base station and the mobile terminal. The radio base station includes control means for handing over the subordinate relay base station to a neighboring radio base station when a load on the radio base station is greater than a predetermined threshold.

A load distribution method according to an eighth exemplary aspect of the present invention is a method of distributing load on a mobile communication system including a mobile terminal, a radio base station, and a relay base station that relays radio communication between the radio base station and the mobile terminal. This method includes the step of handing over the relay base station subordinate to the radio base station to a neighboring radio base station when a load on the radio base station is greater than a predetermined threshold.

Advantageous Effects of Invention

According to the present invention, it is possible to provide an advantageous effect of achieving load distribution in a short period of time.

DESCRIPTION OF EMBODIMENTS

Hereinafter, exemplary embodiments of the present invention will be described with reference to the drawings. First, the outline of a mobile communication system according to this exemplary embodiment will be described. The mobile communication system according to this exemplary embodiment includes a mobile terminal, a radio base station, and a relay base station that relays radio communication between the radio base station and the mobile terminal. The radio base station includes control means for handing over a subordinate relay base station to a neighboring radio base station when a load on the radio base station is greater than a predetermined threshold.

Generally, the relay base station is installed so as to provide services to an area where it is difficult for radio waves to penetrate at the end of a cell formed by a radio base station. Accordingly, the distance between the relay base station and the radio base station connected to the relay base station is substantially the same as the distance between the relay base station and the neighboring radio base station in many cases. This allows the relay base station to receive radio waves from the neighboring radio base station. Therefore, when the load on the radio base station that accommodates the relay base station increases, the radio base station hands over the subordinate relay base station to the neighboring radio base station, thereby achieving load distribution in a short period of time.

Figure 2:
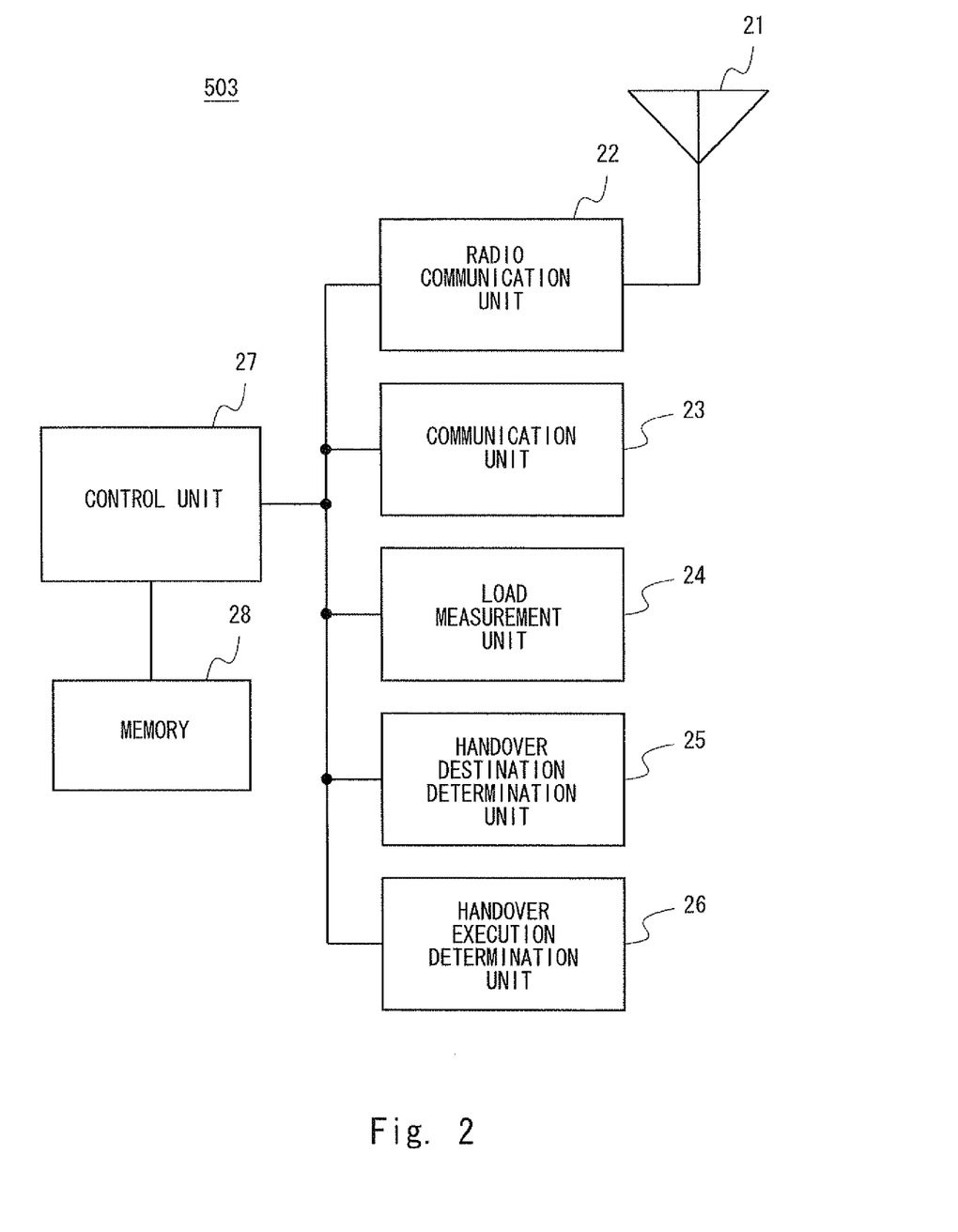
FIG. 2 is a diagram showing a configuration of a radio base station shown in FIG. 1.

FIG. 1 shows an LTE network configuration according to this exemplary embodiment. FIG. 2 shows a configuration of a radio base station 503 shown in FIG. 1 according to this exemplary embodiment. Referring to FIG. 2, a radio communication unit 22 communicates with a mobile terminal 505 and a relay base station 504 through an antenna 21. A communication unit 23 communicates with a core network (MME 501 and S-GW502) and a neighboring radio base station 503. A load measurement unit 24 measures a load on its own radio base station.

A handover destination determination unit 25 determines a handover destination radio base station based on load information on the neighboring radio base station 503 and a DeNB flag which will be described later. A handover execution determination unit 26 determines to execute handover of the relay base station 504 based on a measurement report relating to the reception quality of the handover destination radio base station in the relay base station 504. A control unit 27 controls operation of each unit described above in accordance with a program stored in a memory 28.

Figure 3:
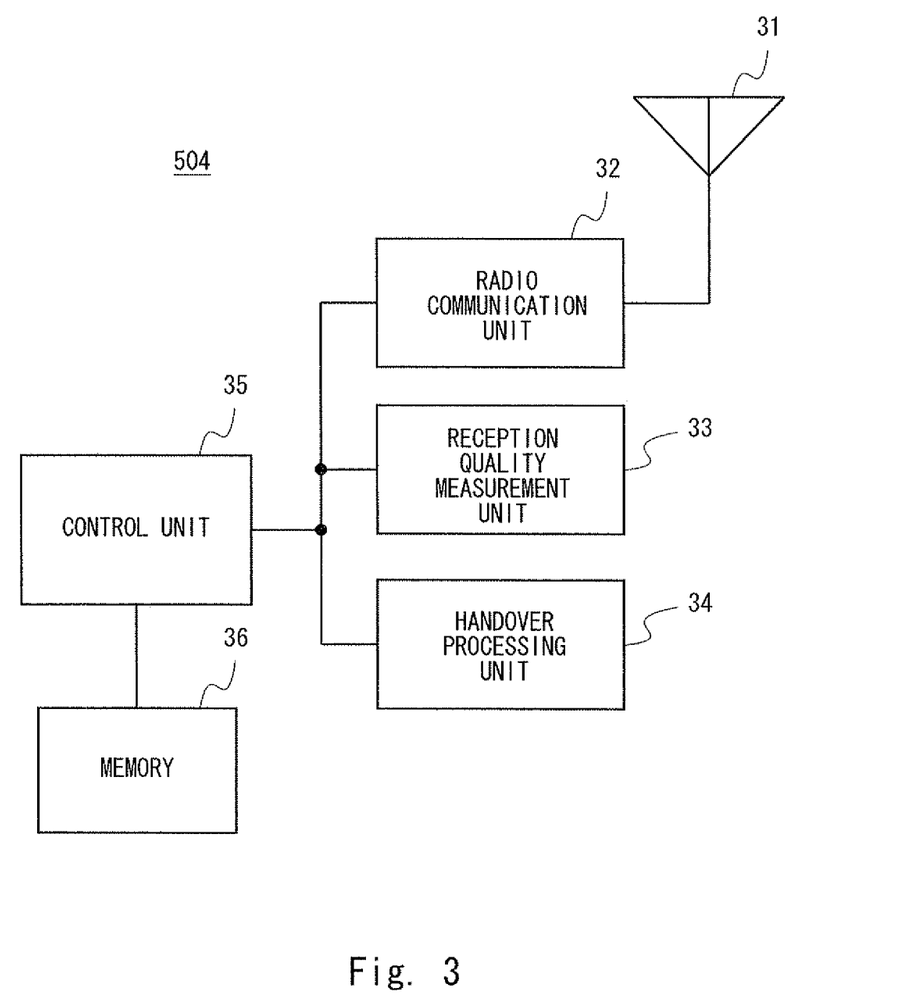
FIG. 3 is a diagram showing a configuration of a relay base station shown in FIG. 1.

FIG. 3 is a diagram showing a configuration of the relay base station 504 shown in FIG. 1 according to this exemplary embodiment. Referring to FIG. 3, a radio communication unit 32 communicates with the mobile terminal 505 and the radio base station 503 through an antenna 31. A reception quality measurement unit 33 measures a reception signal quality from the radio base station 503. A handover processing unit 34 performs handover processing for the relay base station in accordance with instructions from the radio base station 503 that accommodates the relay base station. A control unit 35 controls operation of each unit described above in accordance with a program stored in a memory 36.

Figure 4:
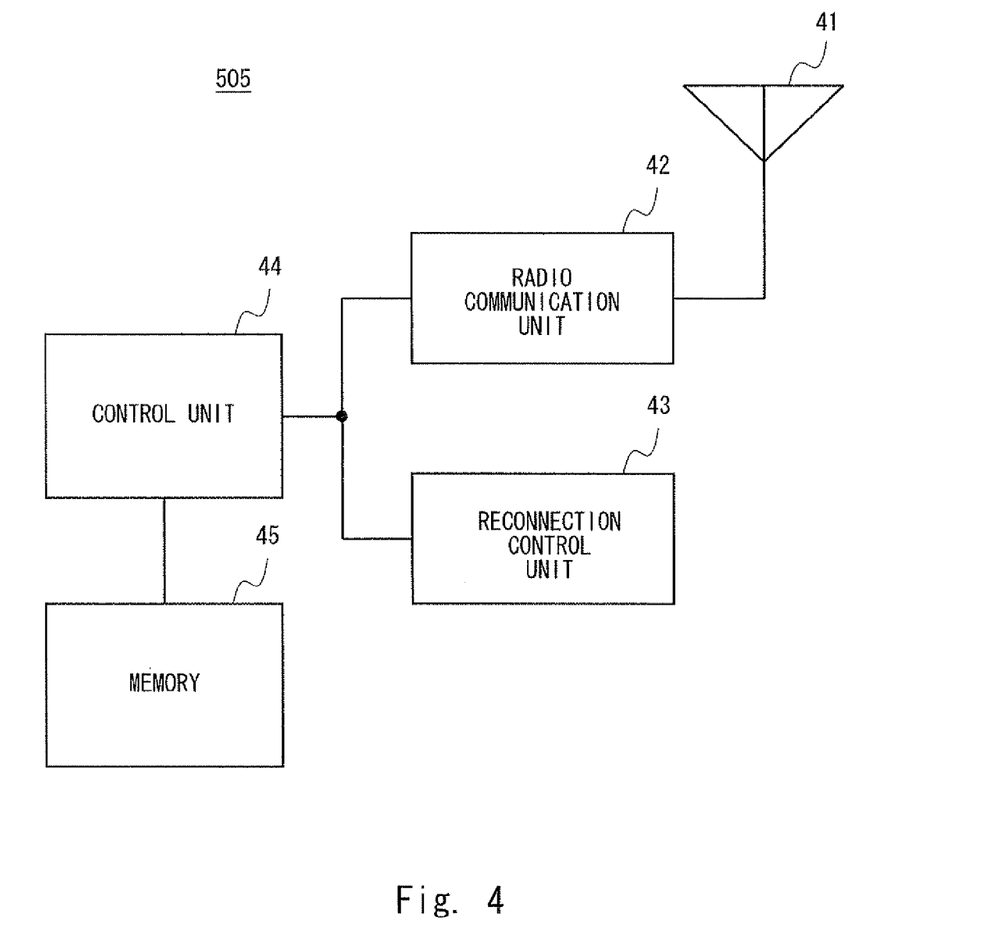
FIG. 4 is a diagram showing a configuration of a mobile terminal shown in FIG. 1.

FIG. 4 is a diagram showing a configuration of the mobile terminal 505 shown in FIG. 1 according to this exemplary embodiment. Referring to FIG. 4, a radio communication unit 42 communicates with the relay base station 504 and the radio base station 503 through an antenna 41. A reconnection control unit 43 reconnects to the relay base station 504 at a reconnection start time notified from the relay base station 504 during the handover of the relay base station 504 that accommodates the mobile terminal. A control unit 44 controls operation of each unit described above in accordance with a program stored in a memory 45.

The devices shown in FIGS. 1 to 4 have a number of functions in addition to the above-mentioned functions. However, these functions are well known to those skilled in the art and are not directly related to the present invention, so the detailed description thereof is omitted.

Figure 5:
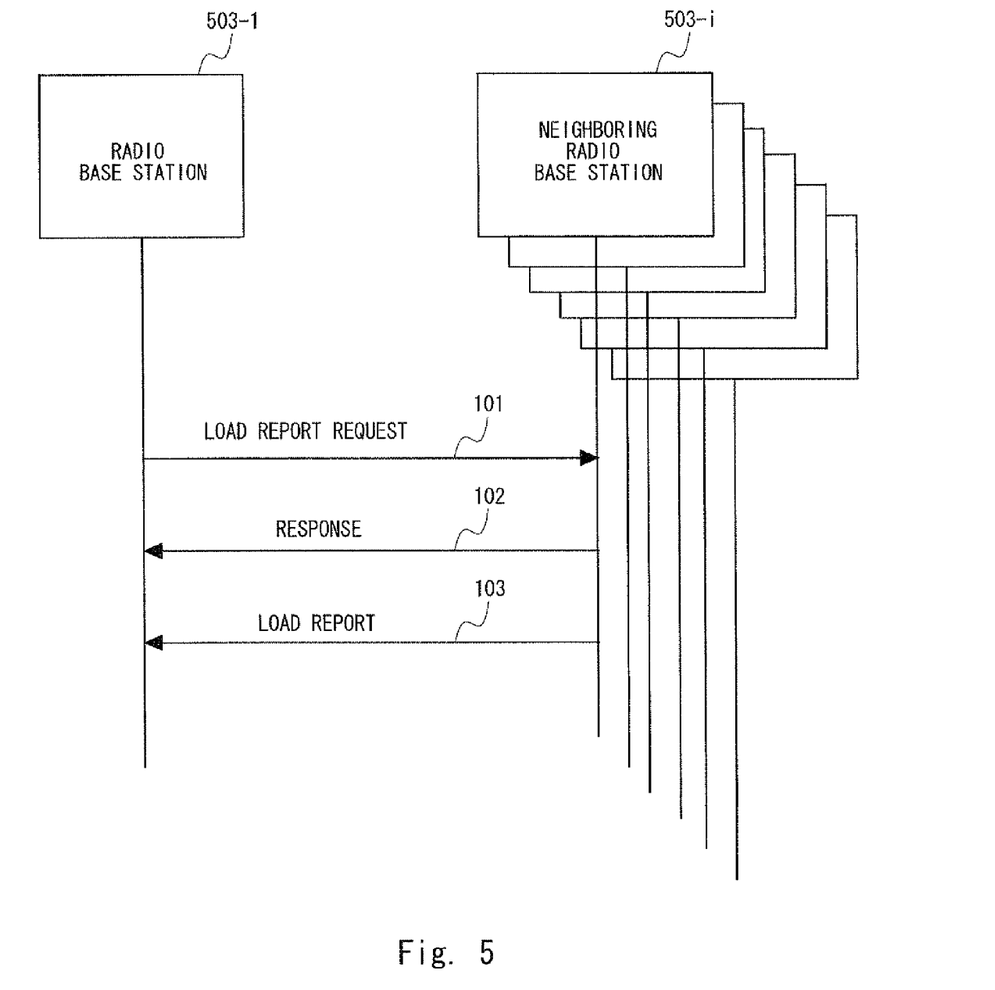
FIG. 5 is a sequence chart showing a procedure in which a radio base station that accommodates the relay base station shown in FIG. 1 collects load information from a neighboring radio base station.

FIG. 5 is a sequence chart showing a procedure in which a radio base station 503-1 that accommodates the relay base station 504 collects load information from a neighboring radio base station 503-*i*. The radio base station 503-1 uses X2 messages to recognize the load on the neighboring radio base station 503-*i*. Referring to FIG. 5, the radio base station 503-1 that accommodates the relay base station 504 requests the neighboring radio base station 503-*i* to report the load (step 101).

The neighboring radio base station 503-*i* sends a response including a flag which indicates whether or not to accept the relay base station 504, i.e., the DeNB flag which indicates whether the radio base station 503-*i* can serve as a Doner eNB (DeNB) (step 102). This is because the DeNB is required to have a proxy function, since it is necessary to transfer data between the relay base station 504 and the core network. There is a possibility that the radio base station 503 which does not have this function exists. The neighboring radio base station 503-*i* performs the load report (step 103).

Figure 6:
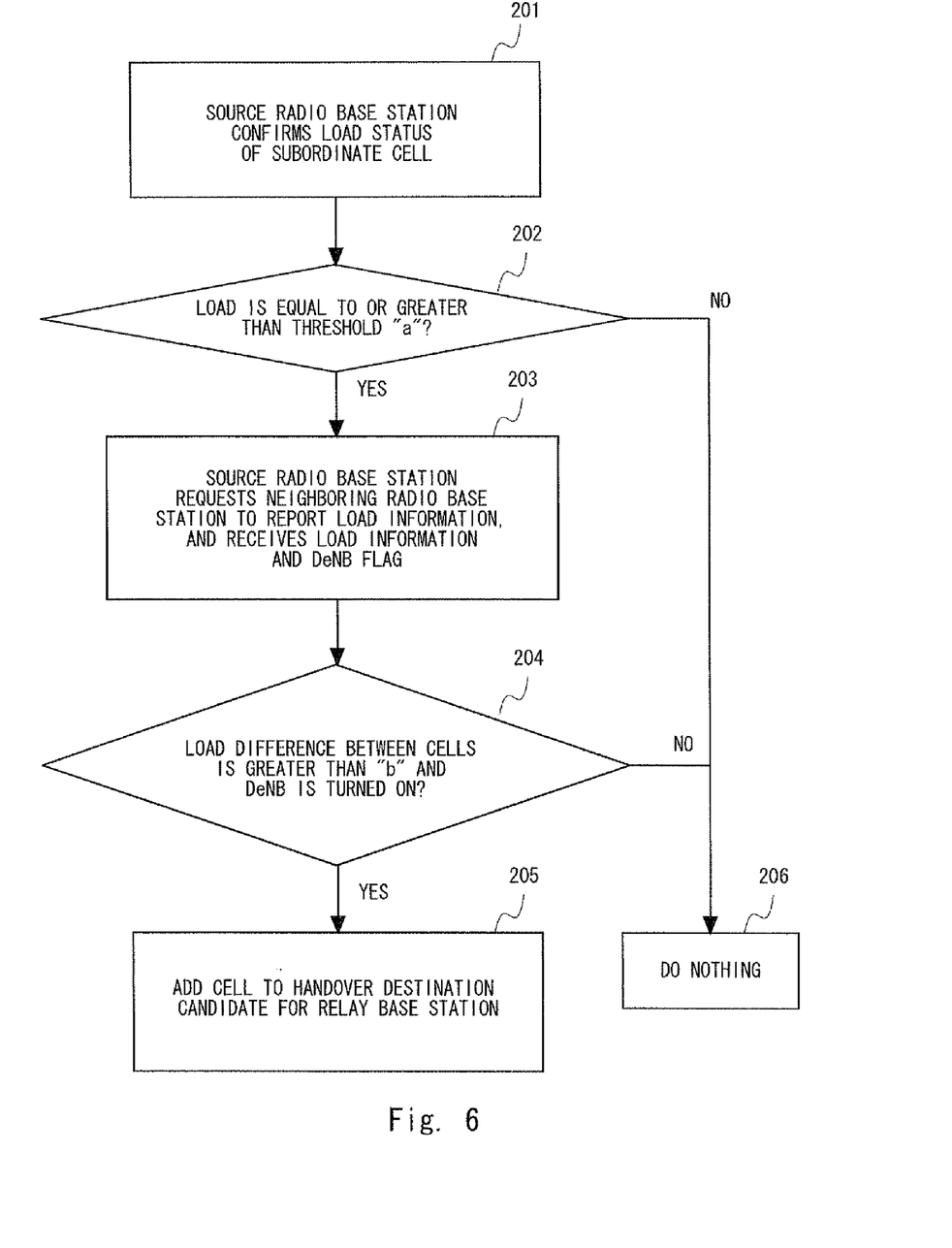
FIG. 6 is a flowchart showing an operation for determining a handover destination candidate in the radio base station that accommodates the relay base station shown in FIG. 1.

FIG. 6 is a flowchart showing an operation for determining a handover destination candidate in the radio base station 503 that accommodates the relay base station 504. Referring to FIG. 6, the radio base station (source radio base station) 503 that accommodates the relay base station 504 periodically confirms the load status of a subordinate cell (step 201). When load on the cell subordinate to the source radio base station 503 is equal to or greater than a threshold "a", the source radio base station 503 requests the neighboring radio base station 503 to report the load (steps 202 and 203).

The source radio base station 503 confirms whether a difference obtained by subtracting the load on the neighboring cell from the load on the subordinate cell is greater than a threshold "b". Further, the source radio base station 503 confirms whether the DeNB flag, which indicates whether the radio base station can serve as the DeNB and is reported from the neighboring radio base station 503, is turned on, and then determines the neighboring cell as a handover destination candidate for the relay base station 504 (steps 204 and 205).

Figure 7:
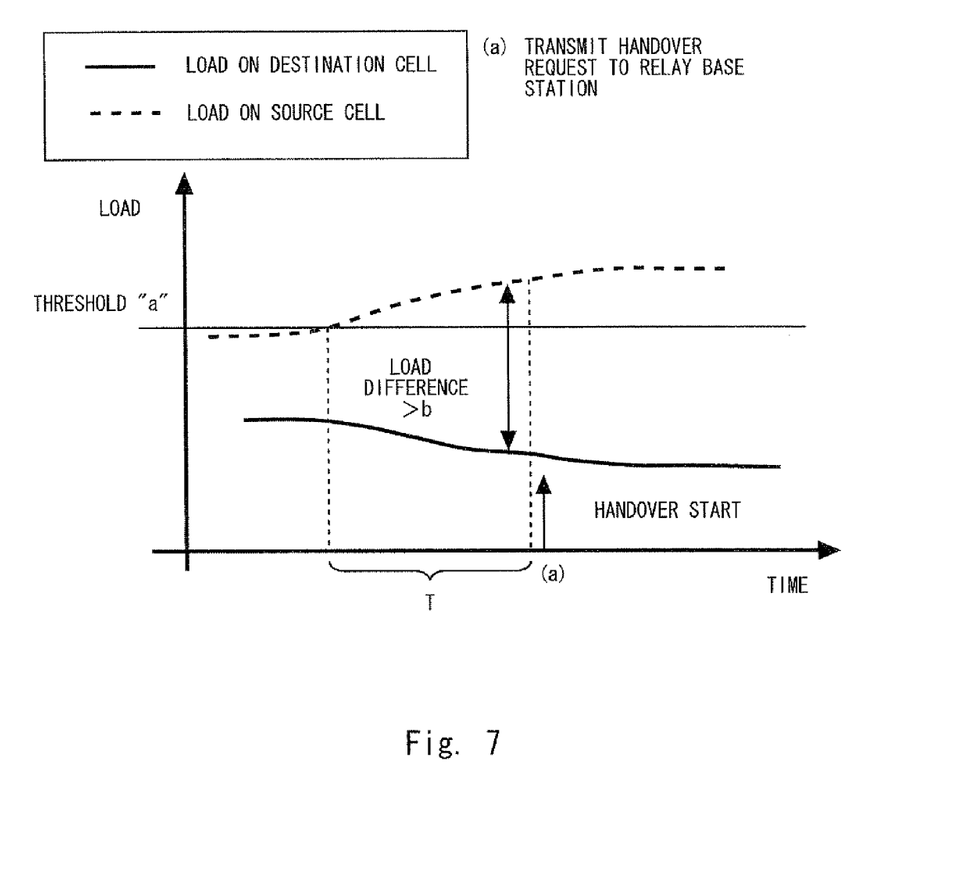
FIG. 7 is a diagram showing a load status at the time of determining a handover destination in the radio base station that accommodates the relay base station shown in FIG. 1.

FIG. 7 is a diagram showing a load status at the time of determining a handover destination. With reference to FIG. 7, an operation for determining a handover destination in the radio base station (source radio base station) 503 that accommodates the relay base station 504 will be described. When the state where the load on the source radio base station 503 is equal to or greater than the threshold "a" is continued for a time T or longer, the source radio base station 503 determines, as a handover destination, an neighboring cell having a maximum difference and the turned-on DeNB flag, from among neighboring cells in which the difference obtained by subtracting the load on each neighboring cell from the load on the subordinate cell is greater than the threshold "b".

Figure 8:
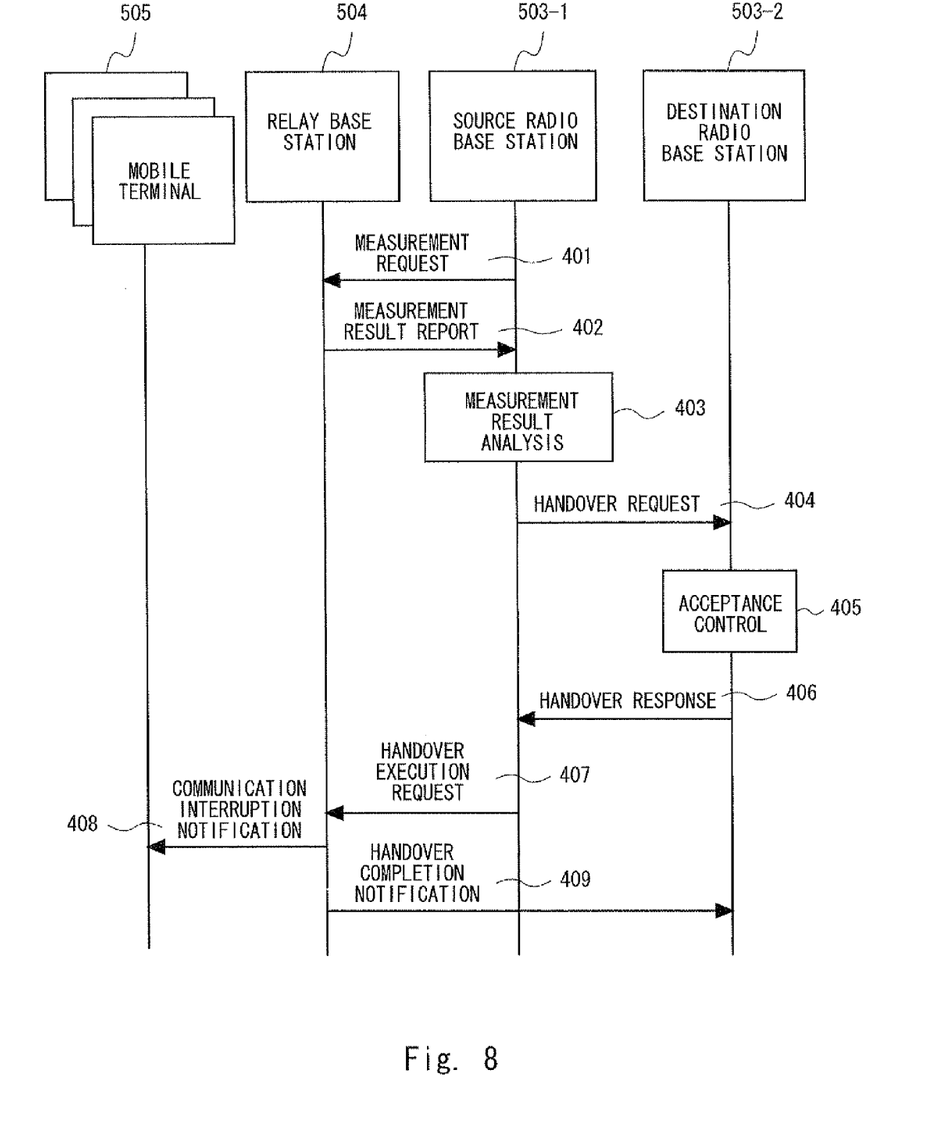
FIG. 8 is a sequence chart showing a handover procedure for the relay base station shown in FIG. 1.

FIG. 8 is a sequence chart showing a handover procedure for the relay base station 504 in the mobile communication system shown in FIG. 1. Referring to FIG. 8, the radio base station (source radio base station) 503-1 that accommodates the relay base station 504 instructs the subordinate relay base station 504 about a cell subordinate to the radio base station 503-2, which is the handover destination determined as described above, and requests the relay base station 504 to measure the reception quality of the designated cell, in order to shorten the measurement time (step 401).

As a result of the measurement of the reception quality of the designated cell, when the reception quality of the cell is equal to or greater than a threshold "c", the source radio base station 503-1 transmits a handover request to the destination radio base station 503-2 that controls the cell (steps 402 to 404). Note that the measurement report at step 402 corresponds to the above-mentioned Event A4. The destination radio base station 503-2 having received the handover request performs an acceptance control and sends a response to the source radio base station 503-1 (steps 405 and 406). The source radio base station 503-1 having received the response transmits a handover execution request to the relay base station 504 (step 407).

The relay base station 504 having received the handover execution request notifies the subordinate mobile terminal 505 of occurrence of a temporal interruption of communication (step 408). The relay base station 504 includes, in this notification, information on a reconnection start time. The relay base station 504 performs the notification so as to set different reconnection start times for respective mobile terminals 505, in order to prevent simultaneous occurrence of connection requests from respective mobile terminals 505. The relay base station 504 connects to the cell notified by the handover execution request, and notifies completion of the handover (step 409).

The mobile terminal 505 having been notified of the occurrence of the interruption of communication suspends the communication. At the notified reconnection start time, the mobile terminal 505 transmits a connection request to the relay base station 504 to try reconnection. Also during the interruption of communication, the mobile terminal 505 maintains an RRC (Radio Resource Control)-connected state in which a radio link is established with the base station. The reconnection start time is set to be longer than the time required for the relay base station 504 to complete the handover.

As described above, in this exemplary embodiment, the radio base station 503 that accommodates the relay base station 504 hands over the subordinate relay base station 504 to the neighboring radio base station 503 when the load on the radio base station is high, so that load distribution can be achieved in a short period of time with a small number of messages.

Furthermore, in this exemplary embodiment, the relay base station 504 having received the handover execution request notifies the subordinate mobile terminal 505 of the occurrence of the interruption of communication, thereby enabling the mobile terminal 505 to connect to the same relay base station 504 again after a predetermined period of time. If this mechanism is omitted, the mobile terminal 505 detects a link failure and tries to execute handover to a neighboring radio base station. If the mobile terminal 505 succeeds in the handover, it is considered that the mobile terminal 505 executes handover to the relay base station 504, which has completed handover, again after a predetermined period of time. Thus, the number of occurrences of handover increases and the mobile terminal 505 cannot receive data during the handover and before and after the handover, which results in an increase of the communication interruption time. On the other hand, if the mobile terminal 505 fails in the handover, the mobile terminal 505 makes the transition to an Idle mode, and searches neighboring cells in the surrounding area in such a state. As a result, a time period in which communication cannot be conducted occurs and the number of executions of cell search increases.

In contrast, in this exemplary embodiment, as described above, the relay base station 504 notifies the subordinate mobile terminal 505 of the occurrence of the interruption of communication, and the mobile terminal 505 reconnects to the same relay base station 504 after a predetermined period of time while maintaining the RRC-connected state, so that it is possible to shorten the time period in which communication is interrupted in the mobile terminal 505. Moreover, the number of occurrences of handover and the number of executions of cell search can be reduced, so that it is possible to achieve power saving of the mobile terminal 505.

The present invention has been described above with reference to exemplary embodiments, but the present invention is not limited to the above-mentioned exemplary embodiments. The configuration and details of the present invention can be modified in various manners which can be understood by those skilled in the art within the scope of the invention.

This application is based upon and claims the benefit of priority from Japanese patent application No. 2010-267950, filed on Dec. 1, 2010, the disclosure of which is incorporated herein in its entirety by reference.

The whole or part of the exemplary embodiments disclosed above can be described as, but not limited to, the following supplementary notes.

[Supplementary Note 1]

A relay base station that relays radio communication between a radio base station and a mobile terminal in a mobile communication system, the relay base station comprising:

control means for receiving a handover execution request transmitted from the radio base station to hand over the relay base station from the radio base station to a neighboring radio base station when a load on the radio base station is greater than a predetermined threshold in the radio base station, and for executing handover to the neighboring radio base station, wherein the control means is configured to notify the subordinate mobile terminal of occurrence of a temporal interruption of communication during the handover to the neighboring radio base station.

[Supplementary Note 2]

The relay base station according to Supplementary note 1, wherein the notification of the interruption of communication to the mobile terminal includes information on a reconnection start time designating a time for the mobile terminal to reconnect to the relay base station.

[Supplementary Note 3]

The relay base station according to Supplementary note 1 or 2, further comprising:

measurement means for receiving a measurement request designating the neighboring radio base station as a handover destination, a reception signal quality of which is to be measured, the measurement request being transmitted from the radio base station upon handover of the relay base station, and for then measuring the reception signal quality of the designated neighboring radio base station; and transmission means for reporting the measured reception signal quality to the radio base station.

[Supplementary Note 4]

A mobile communication system comprising:

a mobile terminal;

a radio base station; and a relay base station that relays radio communication between the radio base station and the mobile terminal, wherein the radio base station includes control means for handing over the subordinate relay base station to a neighboring radio base station when a load on the radio base station is greater than a predetermined threshold, and wherein the control means is configured to confirm whether the neighboring radio base station can accept the relay base station upon handover of the relay base station.

[Supplementary Note 5]

The mobile communication system according to Supplementary note 4, wherein when the control means is configured to:

transmit, to the relay base station upon handover of the relay base station, a measurement request designating the neighboring radio base station as a handover destination, a reception signal quality of which is to be measured; and confirm whether the reception signal quality of the neighboring radio base station in the relay base station is greater than a predetermined threshold.

[Supplementary Note 6]

The mobile communication system according to Supplementary note 4 or 5, wherein the relay base station includes transmission means for receiving a handover execution request transmitted from the radio base station to hand over the relay base station, and for then notifying the subordinate mobile terminal of occurrence of a temporal interruption of communication.

[Supplementary Note 7]

The mobile communication system according to Supplementary note 6, wherein the notification of the interruption of communication to the mobile terminal includes information on a reconnection start time designating a time for the mobile terminal to reconnect to the relay base station.

[Supplementary Note 8]

The mobile communication system according to Supplementary note 7, wherein the mobile terminal includes control means for maintaining an RRC_connected state and for sending a connection request to the relay base station at the recognition start time, upon reception of the notification.

REFERENCE SIGNS LIST

21, 31, 41 ANTENNA
22, 32, 42 RADIO COMMUNICATION UNIT
23 COMMUNICATION UNIT
24 LOAD MEASUREMENT UNIT
25 HANDOVER DESTINATION DETERMINATION UNIT
26 HANDOVER EXECUTION DETERMINATION UNIT
27, 35, 44 CONTROL UNIT
28, 36, 45 MEMORY
33 RECEPTION QUALITY MEASUREMENT UNIT
34 HANDOVER PROCESSING UNIT
43 RECONNECTION CONTROL UNIT
501 MME
502 S-GW
503 RADIO BASE STATION
504 RELAY BASE STATION
505 MOBILE TERMINAL

The invention claimed is:

1. A relay base station that relays radio communication between a radio base station and a plurality of mobile terminals in a mobile communication system, the relay base station comprising:

a control unit that receives a handover execution request transmitted from the radio base station to hand over the relay base station from the radio base station to a neighboring radio base station when a load on the radio base station is greater than a predetermined threshold in the radio base station, and that then executes handover to the neighboring radio base station, wherein the control is configured to notify each of the subordinate mobile terminals of occurrence of a temporal interruption of communication during the handover to the neighboring radio base station, wherein the notification of the interruption of communication to each of the mobile terminals includes information on a reconnection start time designating a time for each of the mobile terminals to reconnect to the relay base station, and wherein the control unit is further configured to perform the notification so as to set different reconnection start times for the respective mobile terminals.

2. The relay base station according to claim 1, further comprising:

a measurement unit that receives a measurement request designating the neighboring radio base station as a handover destination, a reception signal quality of which is to be measured, the measurement request being transmitted from the radio base station upon handover of the relay base station, and that then measures the reception signal quality of the designated neighboring radio base station; and a transmission unit that reports the measured reception signal quality to the radio base station.

3. A mobile terminal in a mobile communication system including the mobile terminal, a radio base station, and a relay base station that relays radio communication between the radio base station and a plurality of mobile terminals, the mobile terminal comprising:

a control unit that receives, from the relay base station, a notification indicating occurrence of a temporal interruption of communication and information on a reconnection start time during handover of the relay base station to an neighboring radio base station, the relay base station receiving a handover execution request transmitted from the radio base station to hand over the relay base station from the radio base station to the neighboring radio base station when a load on the radio base station is greater than a predetermined threshold in the radio base station, and that then maintains an RRC_ connected state and sends a connection request to the relay base station at the reconnection start time, wherein the reconnection start time is set so as to be different from reconnection start times set for the other mobile terminals.

* * * * *